(12) United States Patent
Park et al.

(10) Patent No.: US 9,255,557 B2
(45) Date of Patent: Feb. 9, 2016

(54) DUAL FUEL INJECTION VALVE APPARATUS INCLUDING A HYBRID NOZZLE FOR DIESEL AND GAS ENGINES

(75) Inventors: Deuk-Jin Park, Ulsan (KR); Ju-Tae Kim, Ulsan (KR)

(73) Assignee: HYUNDAI HEAVY INDUSTRIES, CO., LTD., Ulsan (KR)

( * ) Notice: Subject to any disclaimer, the term of this patent is extended or adjusted under 35 U.S.C. 154(b) by 302 days.

(21) Appl. No.: 13/700,740

(22) PCT Filed: Oct. 27, 2010

(86) PCT No.: PCT/KR2010/007400
§ 371 (c)(1),
(2), (4) Date: Nov. 29, 2012

(87) PCT Pub. No.: WO2011/155670
PCT Pub. Date: Dec. 15, 2011

(65) Prior Publication Data
US 2013/0068193 A1 Mar. 21, 2013

(30) Foreign Application Priority Data
Jun. 7, 2010 (KR) ........................ 10-2010-0053135

(51) Int. Cl.
*F02M 43/04* (2006.01)
*F02D 19/06* (2006.01)
(Continued)

(52) U.S. Cl.
CPC ............ *F02M 43/04* (2013.01); *F02D 19/0647* (2013.01); *F02D 19/0657* (2013.01); *F02D 19/0694* (2013.01); *F02M 47/00* (2013.01); *F02M 61/042* (2013.01); *F02M 61/045* (2013.01); *F02M 61/10* (2013.01); *F02M 61/182* (2013.01); *F02M 61/1826* (2013.01);
(Continued)

(58) Field of Classification Search
CPC ... F02M 37/0064; F02M 43/00; F02M 43/04; F02M 67/14; F02M 63/0078; F02M 45/086
USPC .......................... 123/304, 575; 239/5, 533.2, 239/533.3–533.5, 533.9, 533.12, 584
See application file for complete search history.

(56) References Cited

U.S. PATENT DOCUMENTS 3,450,351 A * 6/1969 Messerschmidt .......... 239/533.3
4,235,375 A * 11/1980 Melotti ........................ 239/125
(Continued)

FOREIGN PATENT DOCUMENTS

| JP | 60-159367 A | 8/1985 |
|----|-------------|--------|
| JP | 11-030164 A | 2/1999 |

(Continued)

Primary Examiner — Hung Q Nguyen
Assistant Examiner — Josh Campbell
(74) Attorney, Agent, or Firm — Rabin & Berdo, P.C.

(57) ABSTRACT

The present invention relates to a dual fuel injection valve apparatus provided with a hybrid nozzle for a diesel engine and a gas engine and an objective thereof is to provide a dual fuel injection valve apparatus provided with a hybrid nozzle for a diesel engine and a gas engine, being capable of respectively injecting two kinds of different fuels from one fuel injection valve by pressure of fuel and tension of a spring.

In a fuel injection valve apparatus for injecting fuel to a cylinder of a diesel engine or a gas engine, the present invention sequentially injects, without mixing, two kinds of fuel through respective nozzle holes by pressure of the two kinds of fuel introduced to a fuel valve and tension of a needle spring.

3 Claims, 7 Drawing Sheets

(51) Int. Cl.
*F02M 61/18* (2006.01)
*F02M 47/00* (2006.01)
*F02M 61/20* (2006.01)
*F02M 61/04* (2006.01)
*F02M 61/10* (2006.01)
*F02M 63/00* (2006.01)

(52) U.S. Cl.
CPC ........... *F02M61/20* (2013.01); *F02M 63/0078* (2013.01); *F02M 2200/46* (2013.01); *Y02T 10/36* (2013.01)

(56) References Cited

U.S. PATENT DOCUMENTS

| | | | | |
|---|---|---|---|---|
| 4,266,727 A | * | 5/1981 | Happel | F02M 43/04 239/409 |
| 4,736,712 A | | 4/1988 | Savkar | |
| 4,856,713 A | * | 8/1989 | Burnett | 239/113 |
| 5,975,433 A | * | 11/1999 | Hasegawa | F02M 45/08 239/533.12 |
| 6,073,862 A | | 6/2000 | Touchette et al. | |
| 6,336,598 B1 | | 1/2002 | Touchette et al. | |
| 6,467,702 B1 | * | 10/2002 | Lambert | F02M 45/086 239/533.12 |
| 6,761,325 B2 | | 7/2004 | Baker et al. | |
| 6,769,635 B2 | * | 8/2004 | Stewart | F02M 45/02 123/299 |
| 7,124,959 B2 | | 10/2006 | Baker et al. | |
| 7,373,931 B2 | * | 5/2008 | Lennox et al. | 123/525 |
| 7,429,007 B2 | * | 9/2008 | Luft | 239/585.5 |
| 2002/0070295 A1 | | 6/2002 | Baker et al. | |
| 2004/0256495 A1 | | 12/2004 | Baker et al. | |

FOREIGN PATENT DOCUMENTS

| | | |
|---|---|---|
| JP | 2006-183468 A | 7/2006 |
| KR | 100299288 b1 * | 7/1993 |
| KR | 10-0299288 B1 | 6/2002 |
| WO | WO 2008056225 A1 * | 5/2008 |

\* cited by examiner

DUAL FUEL INJECTION VALVE APPARATUS INCLUDING A HYBRID NOZZLE FOR DIESEL AND GAS ENGINES

TECHNICAL FIELD

The present invention relates to a dual fuel injection valve apparatus provided with a hybrid nozzle for a diesel engine and a gas engine and, more particularly, to a dual fuel injection valve apparatus provided with a hybrid nozzle for a diesel engine and a gas engine, being capable of respectively injecting two kinds of fuels from one valve by pressure of fuel and compression of a spring.

BACKGROUND ART

Generally, a conventional diesel engine has one needle valve and one spring, wherein the needle valve is opened when fuel having pressure higher than opening pressure is introduced and is closed when the fuel having lower pressure is introduced. In this manner, if the pressure higher than the opening pressure is formed within a fuel valve when fuel of high pressure formed in a fuel pump enters to the fuel valve, the spring lifts the needle valve against a force pressing against the needle valve through pressure of fuel oil, such that the fuel is injected into a cylinder through multiple nozzle holes located on an end terminal of a nozzle. Such a method consists of one mechanism in which all nozzle holes are opened according to a predefined opening pressure, and thus, after the opening pressure is formed, even if higher pressure is introduced to the fuel valve, injection is only continued through a predefined number of nozzle holes. In case of a gas engine, two fuel injection valves, one for a pilot valve and one for a valve using primarily gas, or two needle cylinders are provided to be used, and for two fuel supply paths corresponding thereto, a pipe line that conforms to two valves needs to be installed, thereby requiring two governors for timing control, a linkage device, etc.

In case of a Wartsila-Sulzer approach, an MAN-B & W approach, and a medium-size engine, which are a representative form of a conventional fuel valve, in the Wartsila-Sulzer approach, when pressure is greater than the opening pressure but fails to form a high pressure, fuel flows into the cylinder rather than being injected into the cylinder through multiple nozzle holes fabricated on the nozzle. Also, even after the fuel injection is finished, a space (SAC volume) between the closed needle valve and the nozzle hole is large such that residue fuel remaining in this space flows into the cylinder, thereby causing the problem as described above.

Also, in the MAN-B & W approach, a needle valve in a slide type is adopted to reduce the SAC volume, however, the MAN-B & W approach has limitation in that pressure above the opening pressure cannot be actively coped with. In other words, although the SAC volume is fixed, the SAC volume, which is a space between a low-pressure needle valve and the nozzle, can be minimized after the injection is finished. The fuel injection valve in a dual fuel form is operated with two cylinders, thereby requiring two governors and two links.

DISCLOSURE

Technical Problem

Therefore, the present invention has been made in view of the above-mentioned problems, and an objective of the present invention is to provide a dual fuel injection valve apparatus provided with a hybrid nozzle for a diesel engine and a gas engine, being capable of respectively injecting two different kinds of fuel by spring compression and fuel pressure within one fuel injection valve.

Also, another objective of the present invention is to provide a dual fuel injection valve apparatus provided with a hybrid nozzle for a diesel engine and a gas engine, being capable injecting fuel such as HFO or MDO used in a diesel engine and gas fuel using natural gas from one nozzle within one injector, capable of effectively injecting fuel system of the same base, i.e., in a case of using HFO as main fuel and MDO as pilot fuel, and capable of igniting by using MDO and injecting by using gas as main in a case of using dual fuel.

Technical Solution

The present invention provides a fuel injection valve apparatus for injecting fuel to a cylinder in a diesel engine or a gas engine, including
a fuel valve block connected to a fuel pipe, to which the fuel is provided, so as to be provided with the fuel, the fuel valve block comprising a main fuel passage and a pilot fuel passage in which the provided fuel flows; a hybrid nozzle coupled by a nozzle holder so as to be located below the fuel valve block, the hybrid nozzle each comprising a main nozzle hole connected to the main fuel passage to inject main fuel and a pilot nozzle hole connected to the pilot fuel passage to inject pilot fuel; a pilot needle valve installed to be located within the hybrid nozzle and comprising a pilot connection hole for providing the pilot fuel to the pilot nozzle hole by pilot pressure and a main connection hole for providing the main fuel through the main nozzle hole by main fuel pressure; a main needle valve installed to be located within the pilot needle valve and providing the main fuel to the main nozzle hole by pressure of main injection after pilot fuel injection; and a needle spring connected to the main needle valve through a spring support and having an elastic force used in injection.

Thus, in the present invention, a fuel injection apparatus in an engine using duel fuel injects, without mixing, two kinds of sequential fuel from one valve, without requiring two separate valves, through an internal device to a combustion chamber to be combusted so that a combustion patter using two kinds of fuel, i.e., MDO+HFO and MDO+gas fuel may be achieved, thereby reducing harmful gas (smoke, Nox) within the combustion chamber and improving fuel efficiency.

Also, the present invention may inject two kinds of fuel from one valve, one pipe within a fuel injection valve for injecting fuel to a cylinder according to pressure of fuel discharged from a fuel pump or a gas pipe of an engine for a large vessel, a medium sized engine, or a gas engine and compression of a spring, and the present invention applies to an engine which uses dual fuel, and a location of a needle is connected to a bottom of a nozzle, thereby minimizing an SAC volume through first and second injection to achieve an effect of improving combustion performance and obtaining high fuel efficiency.

Further, the present invention may perform warming up and pilot injection at initial injection by using two kinds of fuel introduced to the fuel valve and may use dual fuel of which combustion performance is sequential by injecting the main fuel afterward, thereby improving combustion performance.

Still further, the present invention may adjust the needle on one cylinder axis, which is simpler than a conventional method, such that only one assembly space is needed within a combustion chamber, thereby achieve many effects such as, for example, simple configuration and assembly within the combustion chamber.

Figure 1:
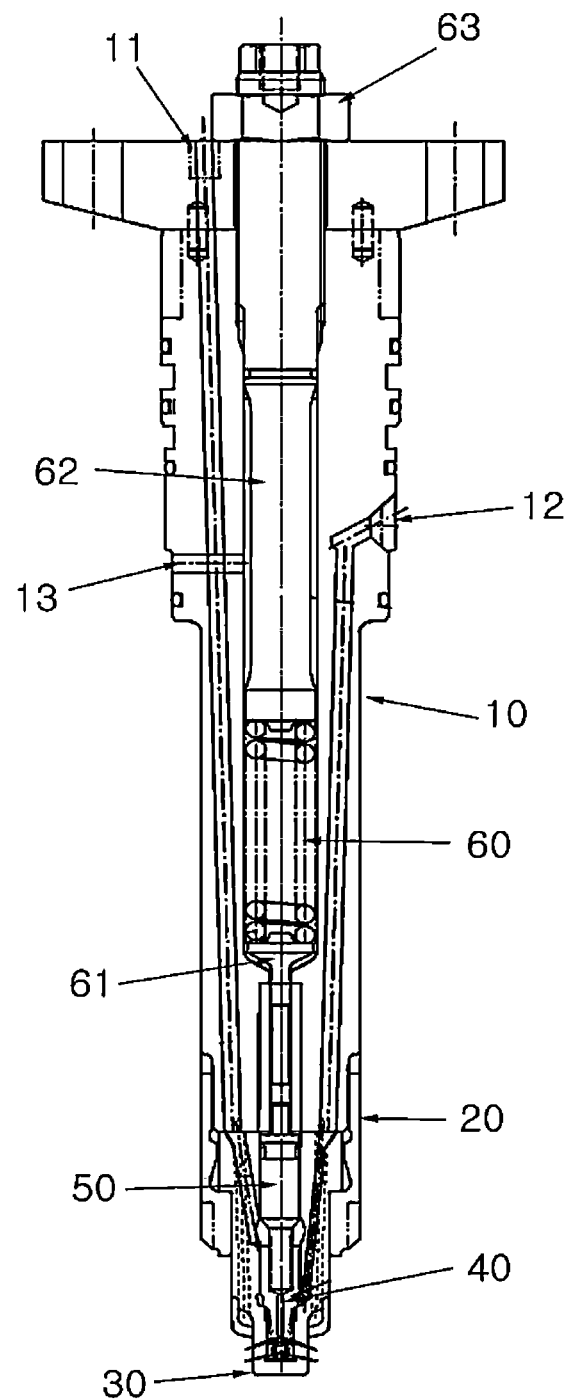
FIG. 1 is an example cross sectional view illustrating an exemplary embodiment of the present invention.

DESCRIPTION OF SYMBOLS (10): Fuel valve block
(11): Fuel oil passage
(12): Pilot oil passage
(20): Nozzle holder
(30): Hybrid nozzle
(31): Main nozzle hole
(32): Pilot nozzle hole
(33): Main fuel pipe
(34): Pilot fuel pipe
(35): Main fuel space
(36): Pilot fuel space
(40): Pilot needle valve
(41): Main connection hole
(42): Pilot connection hole
(50): Main needle valve
(60): Needle spring
(61): Pressure adjustment bolt
(62): Spring support Mode for Invention The present invention relates to a fuel valve for injecting fuel to a cylinder in a diesel engine and a gas engine, in which a needle and a nozzle are crossed such that only one fuel is discharged, without a need for two separate valve apparatuses, according to pressure difference between two fuel and opening pressure of the two fuel by using a spring on one cylinder axis in one valve, thereby always injecting one kind of fuel at a time of combustion.

In other words, in a fuel injection valve apparatus for injecting fuel to a cylinder in a diesel engine or a gas engine, the present invention includes a fuel valve block 10 connected to a fuel pipe, to which the fuel is provided, so as to be provided with the fuel, the fuel valve block comprising a main fuel passage 11 and a pilot fuel passage 12 in which the provided fuel flows; a hybrid nozzle 30 coupled by a nozzle holder 20 so as to be located below the fuel valve block 10, the hybrid nozzle each comprising a main nozzle hole 31 connected to the main fuel passage 11 to inject main fuel and a pilot nozzle hole 32 connected to the pilot fuel passage 12 to inject pilot fuel; a pilot needle valve 40 installed to be located within the hybrid nozzle 30 and comprising a pilot connection hole 42 for providing the pilot fuel to the pilot nozzle hole 32 by pilot pressure and a main connection hole 41 for providing the main fuel through the main nozzle hole 31 by main fuel pressure; a main needle valve 50 installed to be located within the pilot needle valve 40 and providing the main fuel to the main nozzle hole by pressure of main injection after pilot fuel injection; and a needle spring 60 connected to the main needle valve 50 through a spring support 61 and having an elastic force used in injection.

The fuel valve block 10 is provided with the main fuel passage 11 and the pilot fuel passage 12 and is connected to a high pressure fuel pipe (not shown) to which the fuel is provided. A symbol 13, which is not explained, is a drain line.

The hybrid nozzle 30 includes a main fuel pipe 33 having one side connected with the main fuel passage 11 and the other side connected to a main fuel space 35, a pilot fuel pipe 34 having one side connected to the pilot fuel passage 12 and the other side connected to a pilot fuel space 36, the main nozzle hole 31 formed to be located below the pilot passage pipe 34 to inject the main fuel to the cylinder, and a pilot nozzle hole 32 formed to be located below the main nozzle hole 31 to inject the pilot fuel within the cylinder.

Also, the hybrid nozzle 30 is provided with a center hole 37 in which the pilot needle valve 40 and the main needle valve 50 are installed, and the pilot fuel space 36 and the main fuel space 35 are located in the center hole 37, and the pilot fuel space 36 is formed to be located below the main fuel space 35.

The pilot needle valve 40 is moved by pressure of the pilot fuel to inject the pilot fuel within the cylinder through the pilot nozzle hole 32, and the pilot connection hole 42 and the main connection hole 41 are respectively formed therein.

In other words, the pilot needle valve 40 includes a main hole 44 in which the main needle valve 50 is located at a center therein, a main fuel inflow hole 43 connected to the main hole 44, a main connection hole 41 connected to the main connection inflow hole 43, and the pilot connection hole 42 connected to the pilot connection passage 12.

The main needle valve 50 is installed to be located within the hybrid nozzle 30 and is configured to receive an elastic force of the needle spring 60 by the spring support 61.

The needle spring 60 is installed within the fuel valve block 10 to be located between a compression adjustment bolt 62 and the spring support 61. In other words, pressure of the needle spring may be adjusted by a compression adjustment bolt on a cylinder axis. Here, a symbol 63 which is not explained is a pressure nut.

In the present invention configured as above, the pilot needle valve 40 is moved by pilot fuel pressure to inject the pilot fuel within the cylinder through the pilot fuel pipe 34, the pilot connection hole 42, and the pilot nozzle hole 31, and after pilot fuel injection, the pilot needle valve 40 is moved by the main fuel pressure to inject the main fuel through the main fuel pipe 33, the main fuel connection hole 41, and the main nozzle hole 31.

Thus, in the present invention, even when pressure is simultaneously applied through the main fuel passage and the pilot connection passage, two kinds of fuel is not mixed due to pressure difference between the main needle valve and the pilot needle valve which are an internal device and only one kind of fuel is sequentially injected through respective nozzle hole.

Hereinafter, an operation of the present invention will be described in detail as below. In describing the present invention, detailed descriptions of associated well-known functions and structures may be omitted to avoid obscuring the subject matter of the present invention.

Figure 2:
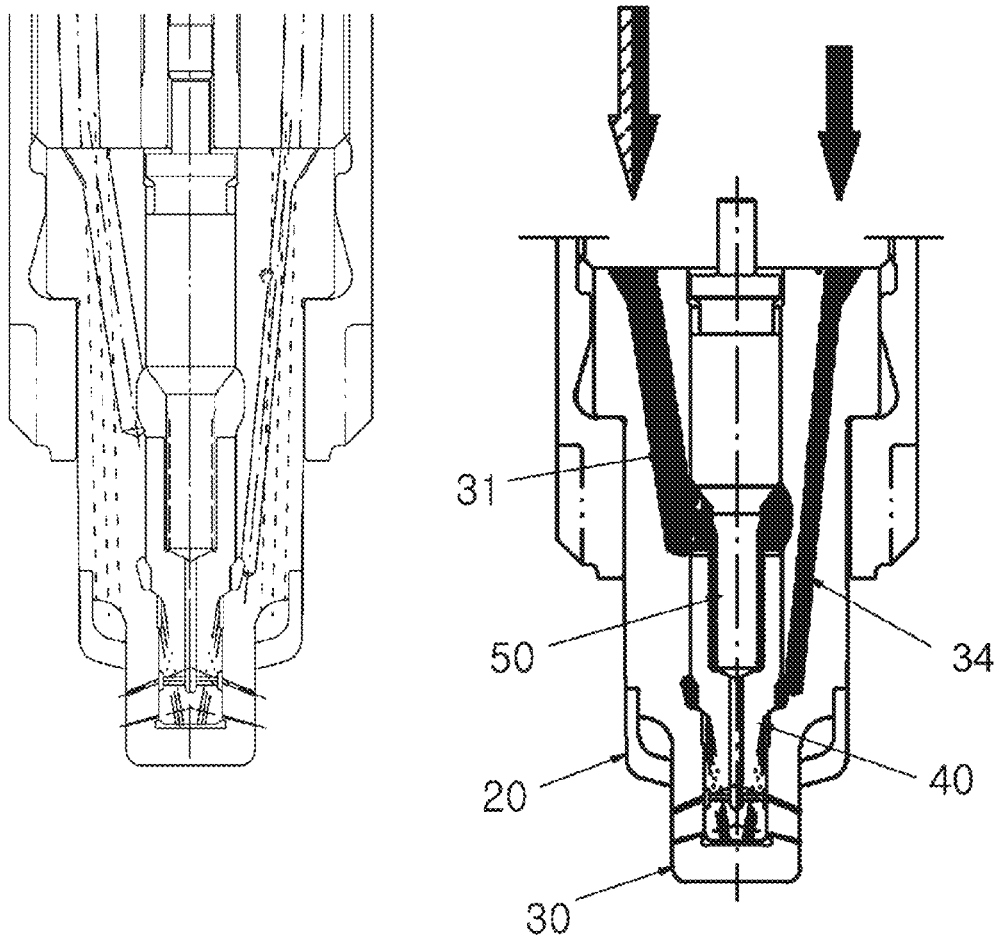
FIG. 2 is an example cross sectional view illustrating an exemplary embodiment prior to opening dual fuel and prior to operation of operation of fuel pressure.

First, as shown in FIG. 2, fuel pressure stands by up to the needle valve 40, 50 through the main fuel passage 11 and the pilot fuel passage 12. Namely, as shown in FIG. 2, prior to fuel injection, fuel introduced into the fuel valve through a high pressure pipe from two kinds of fuel pumps is filled in a fuel passage of the fuel valve, however, pressure thereof is not greater than elasticity of the needle spring 60 such that the fuel is not discharged outwardly but stands by while increasing the pressure. In this case, the main nozzle hole 31 and the pilot nozzle hole 32 are in an injection standby while being in a closed state.

Figure 3:
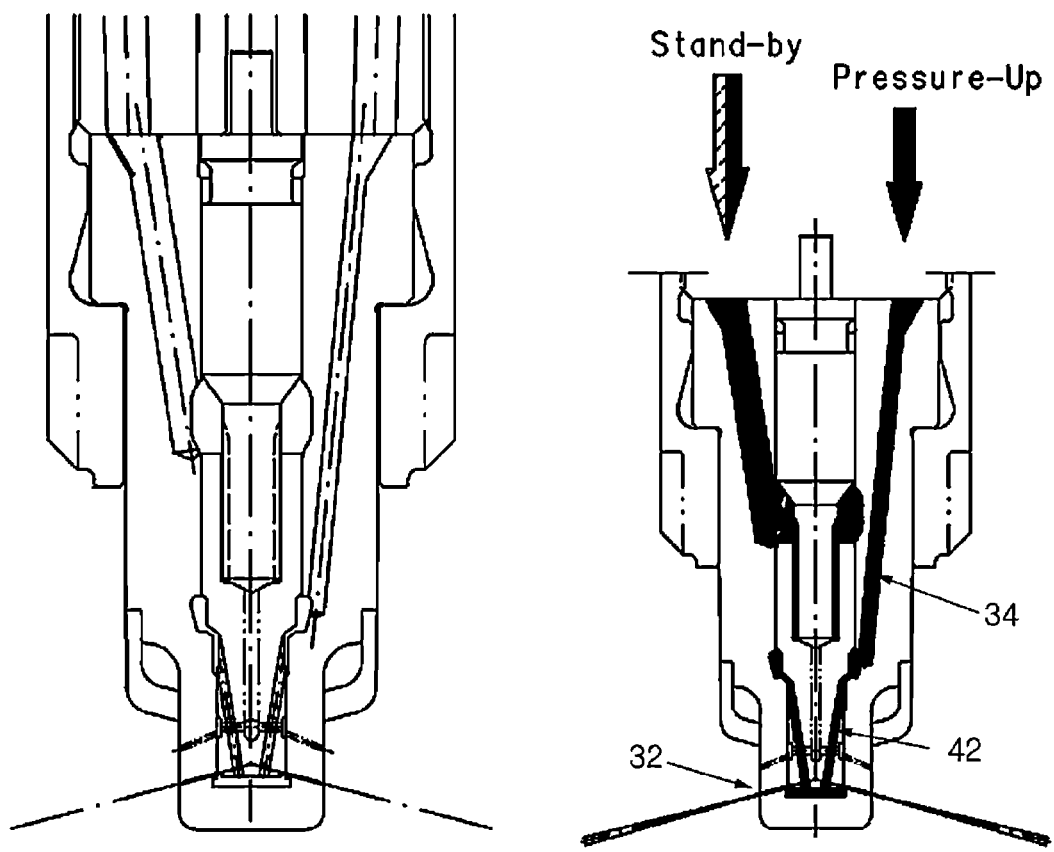
FIG. 3 is an example cross sectional view illustrating an exemplary embodiment of discharging fuel oil after fuel pressure is operated at a time of opening first fuel (pilot fuel) according to the present invention.
Figure 4:
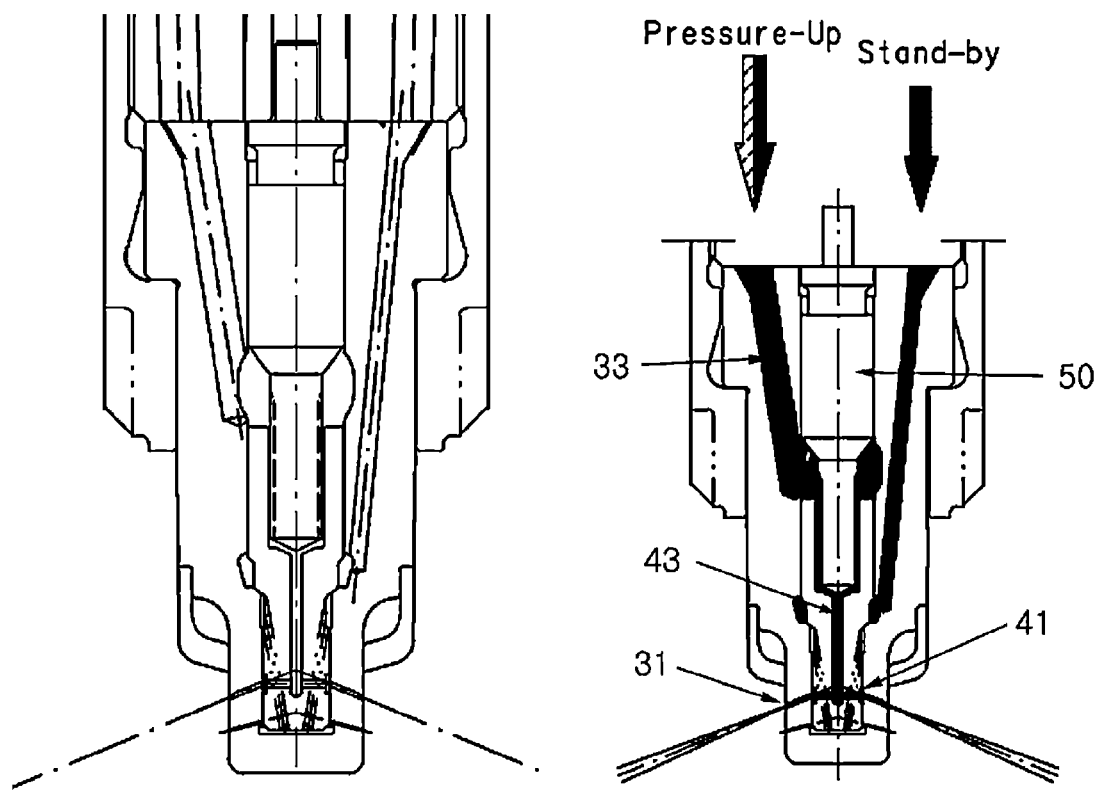
FIG. 4 is an example cross sectional view illustrating an exemplary embodiment of discharging fuel oil after fuel pressure is operated at a time of opening main fuel according to the present invention.
Figure 5:
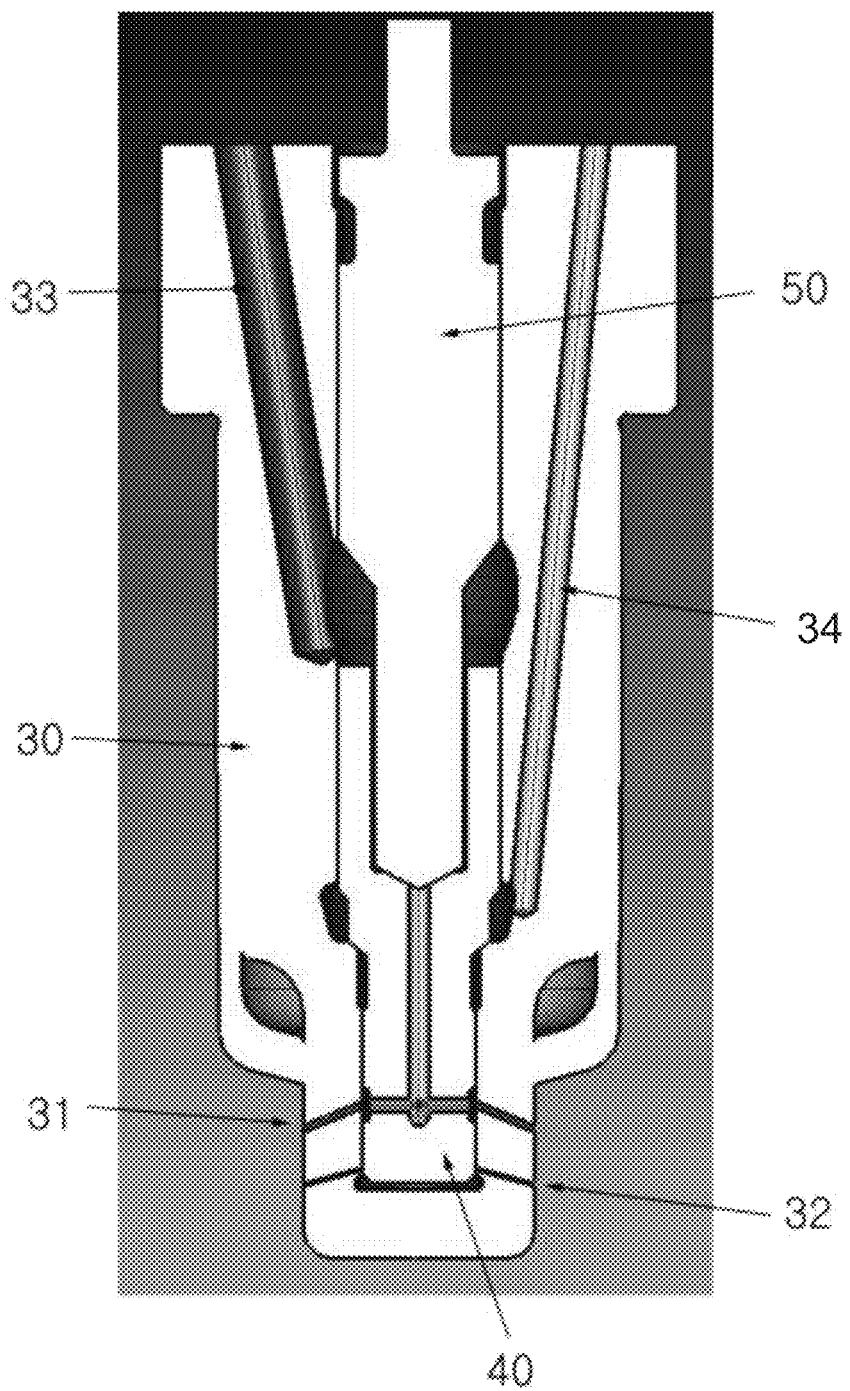
FIG. 5 is an example cross sectional view of an assembly of a valve nozzle, a pilot needle, and a main needle, as cut in half, according to the present invention (a red entrance in a left side is a main fuel injection hole and a yellow injection hole in a right side is a pilot injection hole).
Figure 6:
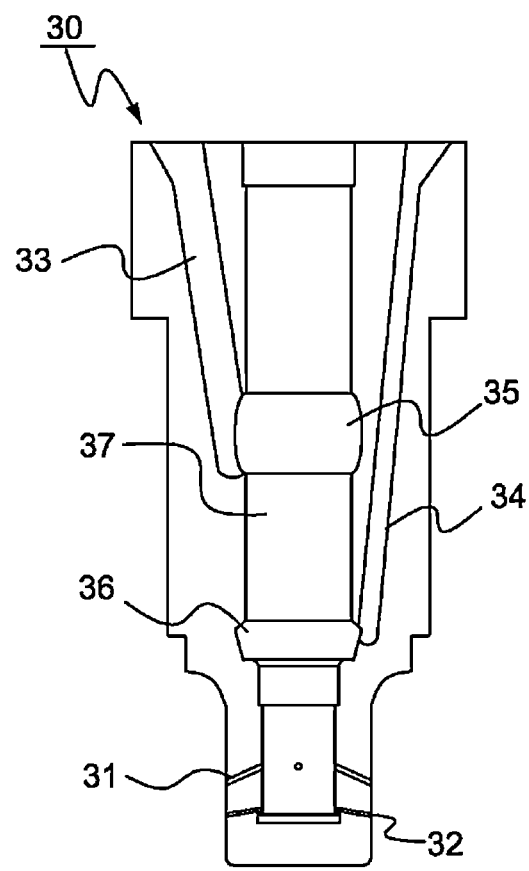
FIG. 6 is an example view illustrating an interior of an entire configuration of a nozzle according to the present invention (four holes are on an upper portion, two being injection holes and two being cooling holes).
Figure 7:
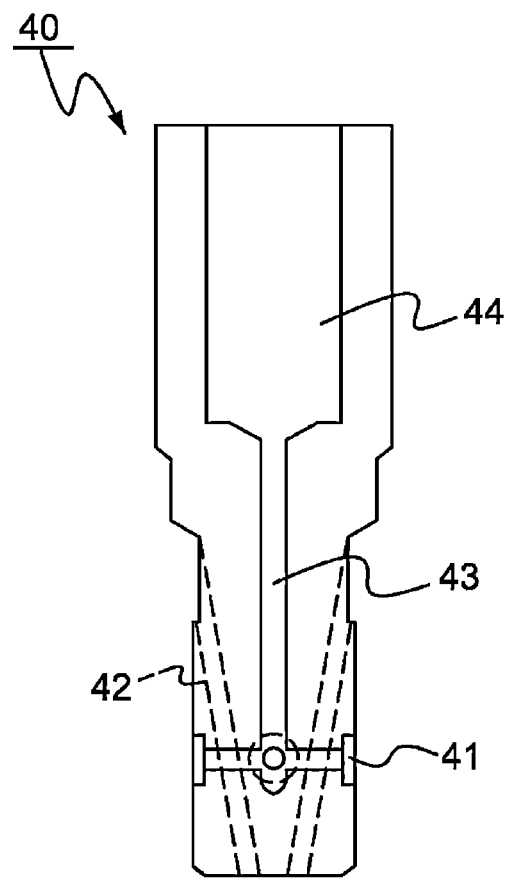
FIG. 7 is an example view illustrating an internal connection hole of a pilot needle according to the present invention (illustrating a hole connecting up to a bottom of the nozzle when pilot injection is operated by pressure).

Also, FIG. 3 and FIG. 4 show a sequential and instantaneous injection form; however, FIG. 3 and FIG. 4 are described separately to describe the essential subject matter of the present invention.

FIG. 3 illustrates injection through the pilot nozzle hole 32 and a closed state of the main nozzle hole 31, and when pressure of the fuel introduced from the pilot fuel passage 12 is greater than pressure of the main fuel to lift upwardly the pilot needle valve 40 and the main needle valve 50, a passage of the main fuel (main fuel connection hole and main nozzle hole) is closed and, at the same time, the pilot fuel is introduced to a bottom of the nozzle through the pilot connection hole 42 of the pilot needle valve 40, thereby performing fuel injection through the pilot nozzle hole 32.

In other words, here, pressure of the pilot fuel from the pilot fuel pump is greater than pressure from the main fuel such that the pilot needle valve 40 and the main needle valve 50 are simultaneously lifted upwardly to perform injection of the pilot fuel through the pilot nozzle hole.

Also, FIG. 4 shows closing of the pilot nozzle hole 32 and injection form of the main nozzle hole 31, and as shown in FIG. 3, at a time point at which pilot pressure is decreased simultaneously with completion of pilot injection, i.e., at a time point at which the pressure of the pilot fuel is decreased than the main fuel pressure, the pilot needle valve 40 is lowered downward by pressure of the main fuel, and here, the main fuel located within the main fuel space is introduced to the main connection hole 41 due to opening (space between the main needle valve and the pilot needle valve) between the main needle valve 50 and the pilot needle valve 40, thereby performing second fuel injection through the main nozzle hole 31.

In other words, the pilot fuel is injected and pressure is decreased while a space is created between the pilot needle valve and the main needle valve at the same time, and the main fuel is introduced through the space to be injected through the main nozzle hole.

Thus, in the present invention, one valve which uses two kinds of fuel is inserted to one valve, one cylinder axis, which is the essence of the present invention, such that one fuel sequentially injects the two kinds of fuel by using pressure difference of the needle valve.

Also, the pilot fuel in the diesel engine referred in the present invention refers to MDO having good combustion and spray and the main fuel may be HFO fuel. Also, in case of the gas engine, fuel such as the MDO may be used for ignition in case of pilot fuel injection and the main fuel may refer to LNG or gas used in a general gas engine.

The present invention is not limited to particular preferable exemplary embodiments described above and it will be understood by those of ordinary skill in the art that various modifications may be made without departing from the spirit and scope of the present invention as defined by the following claims.

What is claimed is:
1. A fuel injection valve apparatus comprising:
   a fuel valve block including
      a main fuel passage supplying a main fuel, and
      a pilot fuel passage supplying a pilot fuel;
   a hybrid nozzle disposed in an end of the fuel valve block and coupled by a nozzle holder, the hybrid nozzle including
      a center hole provided inside the hybrid nozzle and elongated along a central axis of the hybrid nozzle,
      a main nozzle hole disposed in a bottom portion of the hybrid nozzle and injecting only the main fuel to a cylinder,
      a pilot nozzle hole disposed apart from the main nozzle hole between the main nozzle hole and a bottom end of the hybrid nozzle and injecting only the pilot fuel to the cylinder, the pilot fuel being different from the main fuel,
      a main fuel pipe having a first end open to the main fuel passage and supplying the main fuel from the main fuel passage to the center hole of the hybrid nozzle, and
      a pilot fuel pipe having a first end open to the pilot fuel passage and supplying the pilot fuel from the pilot fuel passage to the center hole of the hybrid nozzle;
   a pilot needle valve disposed in a bottom portion of the center hole and including
      a main hole formed inside a top portion of the pilot needle valve and extending along a central axis of the pilot needle valve,
      a main fuel inflow hole formed inside a middle portion of the pilot needle valve and extending along the central axis of the pilot needle valve, the main fuel inflow hole having a first end open to a bottom of the main hole,
      a main connection hole formed inside a bottom portion of the pilot needle valve and having a first end connected to a second end of the main fuel inflow hole and a second end open to the main nozzle hole, and
      a pilot connection hole formed inside the bottom portion of the pilot needle valve separately from the main connection hole and having a first end open at a lateral side of the pilot needle valve and a second end open at a bottom side of the pilot needle valve, the pilot connection hole providing the pilot fuel from the pilot fuel pipe to a space between the bottom side of the pilot needle valve and an inside wall of the hybrid nozzle
   a main needle valve disposed on the top portion of the pilot needle valve separately from the pilot needle valve, wherein one end portion of the main needle valve is slidably inserted into the main hole to open and close the main fuel inflow hole and the opposite end portion of the main needle valve is disposed outside the main hole of the pilot needle valve; and
   a needle spring disposed in the fuel valve block, and pressing the main needle valve and the pilot needle valve through the main needle valve, wherein the main needle valve and the pilot needle valve are pressed by the same needle spring, and the main fuel and the pilot fuel are sequentially injected through the main nozzle hole and the pilot nozzle hole, respectively, due to force differences between the main fuel pressure, the pilot fuel pressure and compressive force of the needle spring.

2. The fuel injection valve apparatus of claim 1, further comprising:
a main fuel space formed between the main needle valve and the pilot needle valve, wherein a second end of the main fuel pipe is open to the main fuel space, and
a pilot fuel space formed between the pilot needle valve and the inside of the hybrid nozzle, wherein a second end of the pilot fuel passage is open to the pilot fuel space.

3. The fuel injection valve apparatus of claim 1, further comprising:
a compression adjustment bolt disposed in the fuel valve block to adjust the compressive force of the needle spring.

* * * * *